United States Patent [19]

Woelfl

[11] 4,006,638
[45] Feb. 8, 1977

[54] ALTIMETER-ENCODER

[75] Inventor: Rudolf G. Woelfl, Woodland Hills, Calif.

[73] Assignee: G & H Technology, Inc., Santa Monica, Calif.

[22] Filed: Oct. 24, 1974

[21] Appl. No.: 517,482

[52] U.S. Cl. .................................................. 73/387
[51] Int. Cl.[2] ......................................... G01L 7/14
[58] Field of Search .................... 73/384, 386, 387; 250/231 R, 231 SE

[56] References Cited
UNITED STATES PATENTS

| | | | |
|---|---|---|---|
| 3,750,473 | 8/1973 | Bennett et al. | 73/387 |
| 3,906,223 | 9/1975 | White | 73/387 |
| 3,916,185 | 10/1975 | Jehly | 73/386 |
| 3,918,307 | 11/1975 | Hulle et al. | 73/387 |

Primary Examiner—Donald O. Woodiel
Attorney, Agent, or Firm—Thomas L. Flattery

[57] ABSTRACT

An aircraft altimeter-encoder is provided with an altitude sensitive barometric or aneroid bellows which simultaneously drives a visual altitude indicator and an altitude digital encoder. The indicator includes one or more pointers that register with a dial. The encoder includes a wheel or disc having a series of transparent and opaque regions scanned by photo-optical means. This generates digital signals corresponding to the altitude indicated on the face of the altimeter. The digital signals are adapted to be fed to a transponder for telemetering to a ground station. The altimeter-encoder includes means for simultaneously adjusting both the indicator and the encoder disc to compensate for variations in the local or ambient barometric pressure. Means are also provided for adjusting the relationship between the indicator and the encoder disc whereby the digital altitude signals coupled to the transponder correspond exactly to the altitude indicated on the face of the altimeter, referenced to 29.92 in Hg barometric pressure.

22 Claims, 10 Drawing Figures

ALTIMETER-ENCODER

BACKGROUND

Heretofore various types of aircraft altimeters have been provided for indicating the altitude at which an aircraft is operating. In the so-called barometric type of altimeter a pressure or altitude sensitive barometric or aneroid bellows is provided. The bellows is a hermetically sealed unit having a diaphragm that is deflected in and out as the ambient barometric pressure varies.

A suitable visual indicator such as one or more pointers are operatively interconnected with the diaphragm by means of a suitable gear train and/or linkage mechanism. As the aircraft ascends and descends, the barometric pressure varies as a function of altitude and the diaphragm is deflected in or out whereby the indicator is moved to indicate the altitude of the aircraft.

If the aircraft is subjected to air traffic control, it is essential the controller know the altitude of the aircraft. Historically, it has been customary for the ground controller to periodically request the pilot to read the aircraft altimeter and relay the reading by radio to the controller.

More recently it has been proposed certain aircraft have a so-called transponder capable of automatically transmitting certain types of information or data such as aircraft altitude to the ground based traffic control station in response to an interrogating signal. Heretofore, in order to accomplish this it has been necessary to add to the aircraft a special altitude encoder which functions separate and distinct from the existing altimeter. Since the altimeter and the encoder are separate units, they may or may not read the same. Alternatively it has been proposed to design a completely new altimeter and encoder. This necessitates designing and obtaining a completely new set of tools, production procedures, inventory of spare parts, servicing procedures, etc. As a result, it has been extremely expensive to produce an acceptable encoder.

SUMMARY

The present invention provides means for overcoming the foregoing difficulties. More particularly, it provides a conversion or adapter for use with an already existing altimeter. This not only permits a simplified and economical construction, but also permits the continued use of the existing tooling, inventory of parts, servicing, etc.

In the embodiment disclosed herein, the altimeter includes an aneroid or barometric bellows sensitive to altitude. This bellows is operatively coupled to a visual indicator on the face of the altimeter by means of a mechanical linkage and gear train. An optical encoder wheel or disc is coupled to the gear train by a drive gear. The disc includes a series of transparent and opaque regions which are coded to correspond to altitude. The disc is scanned by a photo-optical sensor which "reads" the coding on the disc and produces corresponding signals.

In the present instance, this is accomplished by adding a spacer which is designed to fit into the framework of the altimeter. The digital encoder disc is installed inside the spacer and coupled to the gear train by an encoder drive gear. In addition, a suitable electronics package or data chip is added to the rear of the altimeter and coupled to the encoder disc for generating the necessary digital signals. These signals are in turn coupled to the transponder for transmitting the signals to a ground based traffic control center.

DESCRIPTION

Referring to the drawings in more detail, the present invention is embodied in an altimeter encoder 10 intended for use in an aircraft. The altimeter encoder 10 is completely enclosed in an elongated cylindrical case 12. The case 12 is adapted to fit into and through an opening in the instrument panel of the aircraft whereby the front of the altimeter encoder 10 will be readily visable to the pilot and/or other occupants of the aircraft.

The front of the case 12 includes an enlarged head 14 that forms a mounting flange 16. The flange 16 fits against the instrument panel so as to surround the opening therein. The case 12 extends rearwardly behind the instrument panel so as to be concealed from view. A bezel 18 is attached to the enlarged head 14 whereby one or more bolts may pass through the bezel 18, the flange 16 and into the panel for securing the altimeter in position.

A window or observation glass 20 is disposed in the bezel 18. The glass 20 is retained in position by one or more gaskets 22. Suitable indicating means 26 are disposed behind the glass 20 for visually indicating the altitude of the aircraft. Although the indicating means 26 may be of any desired variety, in the present instance the altimeter is of the so-called "three pointer" variety. However, a so-called drum type indicator may be used as well as a so-called drum-counter type.

An altitude dial 28 is provided behind the observation glass 20 and includes a series of indicia from 0 to 9. These indicia are calibrated in feet and extend completely around the dial 28 to provide a continuous scale of altitude. The dial 28 is secured in a fixed position in the head 14 of the case 12 and is separated from the glass 20 by a seal and spacer ring 30.

The spacer ring 30 is preferably composed of a fairly resilient and pliable material that can be deformed, compressed, etc., to some degree. Any suitable sealant material such as rubber, neoprene, etc., can be used. The spacer ring 30 includes two parts — a flange 29 and a skirt 31.

The flange 29 is adapted to fit into an annular groove recessed into the face of the case 12. When the bezel 18 secures the glass 20 in position, the flange 29 is tightly compressed between the case 12 and glass 20. This is effective to seal the interior of the altimeter against any air leaking in and destroying the effectiveness of the altimeter.

The skirt 31 is of a generally cylindrical shape and forms a snug fit with the inside of the case 12. The skirt 31 extends into the interior of the case 12 a relatively short distance and is effective to maintain the spacer ring 30 properly axially aligned within the case 12. At the same time this insures the flange 29 being accurately positioned to maintain a completely air tight seal.

It can be appreciated that the large face formed by the end of the flange 29 provides a broad seal against the inside surface of the glass 20. At the same time the skirt 31 insures the spacer ring 30 being automatically centered and axially aligned when it is initially installed. Moreover, it always maintains the spacer ring 30 properly positioned and axially aligned at all times. As a consequence, a highly effective seal is insured.

It should be appreciated that it is essential this seal be properly maintained at all times. If the seal fails or leaks, there will be a flow of air around the end of the case 12 and/or bezel 18 and into the altimeter. This, of course, will cause an incorrect altitude to be indicated. This is particularly true where the cabin is pressurized.

One or more indicators are provided to register with the indicia on the dial. In the present instance, there are three pointers 32, 34 and 36 which are arranged to indicate hundreds of feet, thousands of feet and ten thousands of feet, respectively.

The three pointers 32, 34 and 36 are mounted on three concentric shafts 38, 40 and 42 which project through the center of the dial 28. A transmission 44 is situated behind the dial 28. The transmission 44 includes a gear train having a series of gears therein disposed between a front cover 46 and a mounting plate 48. The gear train which drives the shafts 38, 40 and 42 produces ten-to-one step down ratios between the successive shafts.

Figure 5:
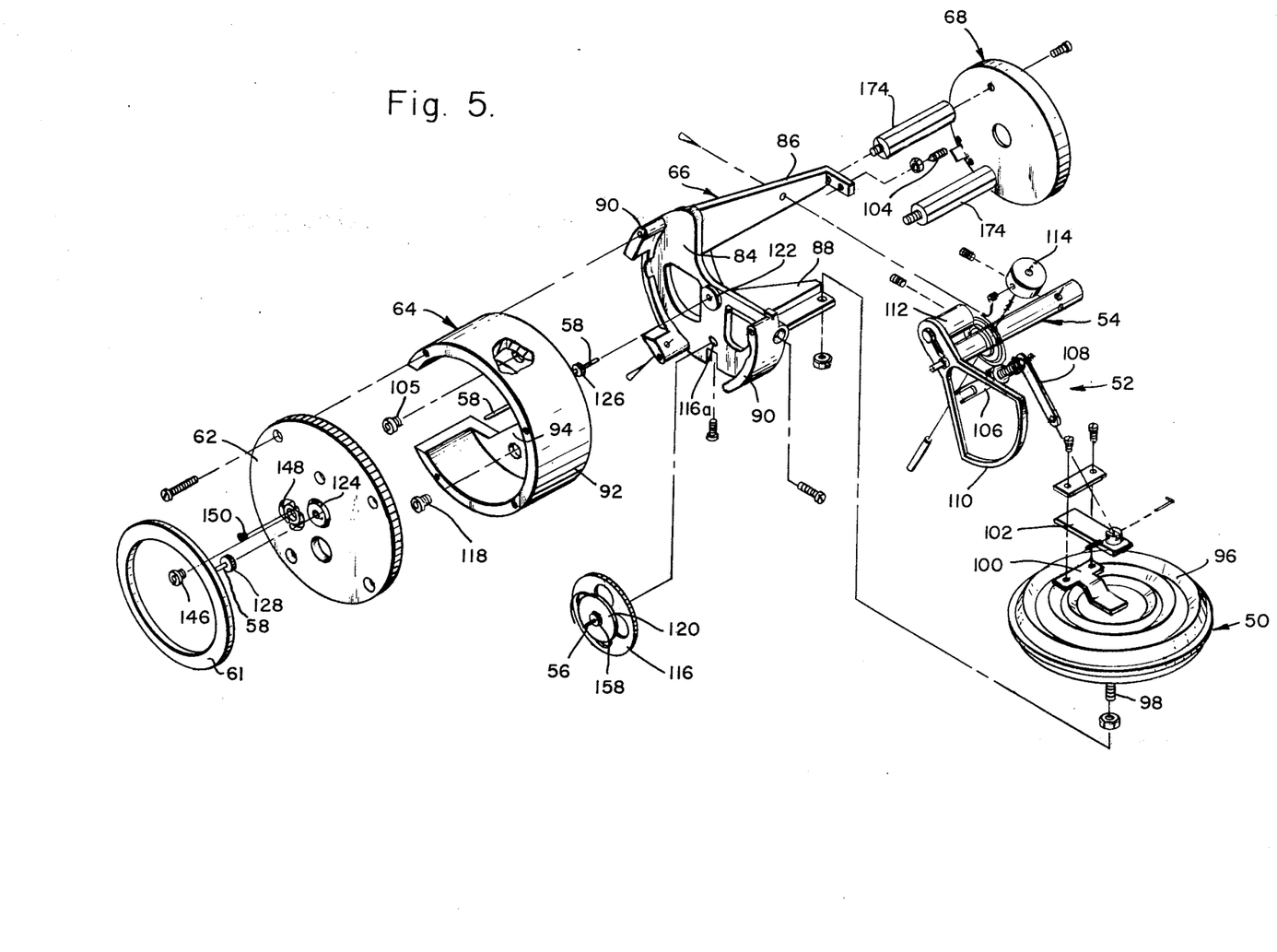
FIG. 5 is an exploded perspective view of a portion of the mechanism of FIG. 4.

The gears in the transmission 44 are operatively connected to an aneroid or barometric capsule or bellows 50. In the present instance this is accomplished by means of a drive train 52 which includes a first or rocker shaft 54, a second or intermediate shaft 56 and a third shaft or hand staff 58. The drive train 52 is best seen in FIG. 5.

The bellows 50, drive train 52, etc., are all mounted on a support assembly 60 which extends longitudinally of the case 12. The support assembly 60 includes a plate or barometric gear 62, a spacer 64, a frame 66, wire bucket 68, etc. These are all secured together and are rotatably mounted so that they are free to turn inside of the case 12.

A zero set or adjustment knob 70 projects from the front of the altimeter encoder 10 to be readily accessible to the pilot. The knob 70 is mounted on the end of a shaft 72 that extends through the enlarged head 14 and along the inside of the case 12. A zero setting gear 74 on the shaft 72 meshes with teeth on the periphery of the barometric gear 78 and teeth on the periphery of a barometric gear 62, respectively.

By manually rotating the knob 70, it is possible to rotatably drive the barometric dial 27 through the barometric gear 78 and the barometric gear 62. As the barometric dial 27 is rotated, a barometric scale 80 thereon is visible through a window 82 in the altitude dial 28. The reading on this scale 80 indicates the ambient barometric pressure for which the altimeter-encoder 10 is set.

As the barometric gear 62 is rotated by turning the knob 70, the entire support assembly 60, the aneroid bellows 50 therein, etc., also rotate. The transmission 44 remains stationary. As a result, the rotation of the support assembly 60 causes the gears, etc., in the transmission 44 to be driven. As a consequence, the positions of the pointers 32, 34 and 36 are varied as the assembly 60 rotates.

Normally there is a certain amount of axial loading which resiliently compresses the various parts of the altimeter together. This results in the adjacent surfaces of the mounting plate 48 and the barometric gear 62 being in sliding contact with each other, i.e., as the barometric gear 62 rotates it rides on the stationary mounting plate 48. If the gear 62 and plate 48 are both made of aluminum and are in direct intimate contact during this sliding action, the surfaces thereof will be subject to extensive galling, scoring, etc., over an extended period of time. This will eventually cause malfunctioning of the altimeter.

In order to avoid the foregoing types of problems, it has been found highly desirable to provide some form of antifriction device to separate the surfaces of the two moving parts and prevent therein contacting each other. In the present instance this is accomplished by means of an annular pad or ring 61. This ring 61 has a sufficiently large diameter to insure its engaging the outer peripheries of the plate 48 and the gear 62.

The ring 61 also acts as a spacer. It has a thickness just thick enough to provide a minimum working clearance between the surfaces. By way of example, the thickness may be in the range of from about 0.005 to 0.010 inches.

If desired, the ring 61 may be allowed to merely float between the two parts. However, in the present instance it is bonded onto one of the parts, i.e., the barometric gear 62 whereby it rotates therewith.

It should be noted that the ring 61 is circular and has no radial edges. As a result, there is no irregularity on the ring 61 which can catch on some part of the plate 48. This is effective to avoid the plate 48 "snagging" on the ring 61 and peeling or lifting it off of the gear 62.

Moreover, because of the large diameter of the ring 61 even if it should come loose from the gear 62, the ring is too large to escape from between the plate 48 and gear 62. As a consequence, it is impossible for it to become lodged in any of the operative or moving parts of the altimeter. Accordingly, it is not possible for the ring to jam the altimeter.

It can be appreciated that although a ring of Teflon is used in the present instance, any other suitable type of antifriction arrangement may be utilized. The ring may be of any type of dry, low friction material including metal and/or it may be a member coated with an antifriction layer. Moreover, although the ring 61 is a separate member, it may be formed integral with one of the parts with an antifriction coating thereon.

This is in essence a zero adjustment to compensate for variations in the ambient barometric pressure. The pilot periodically manipulates the knob 70 to reset the barometric pressure indicated by the portion of the scale 80 visible through window 82. The operation of this adjustment is explained in more detail subsequently.

Figure 1:
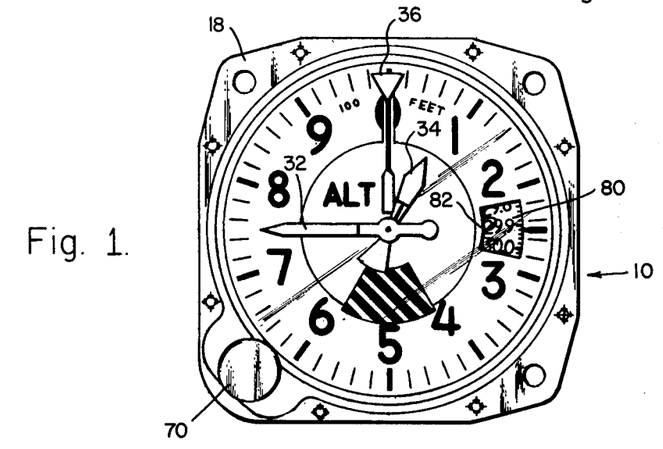
FIG. 1 is a front view of the altimeter encoder embodying one form of the present invention.
Figure 2:
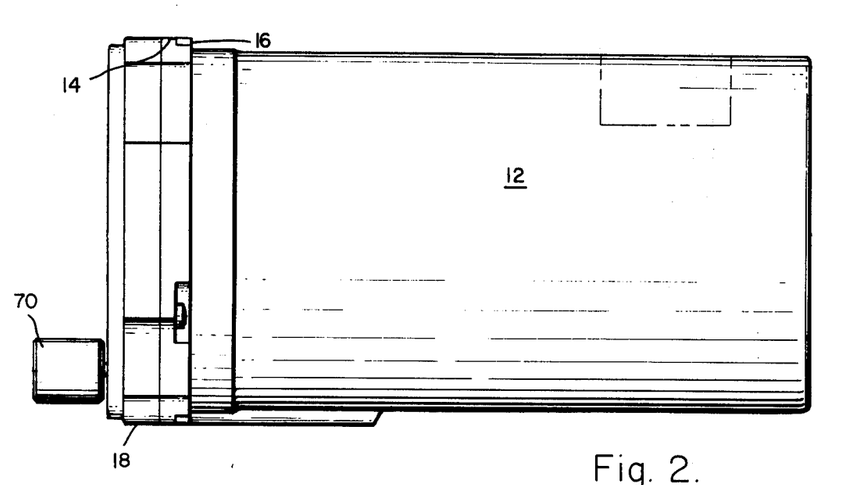
FIG. 2 is a side view of the altimeter encoder of FIG. 1.
Figure 3:
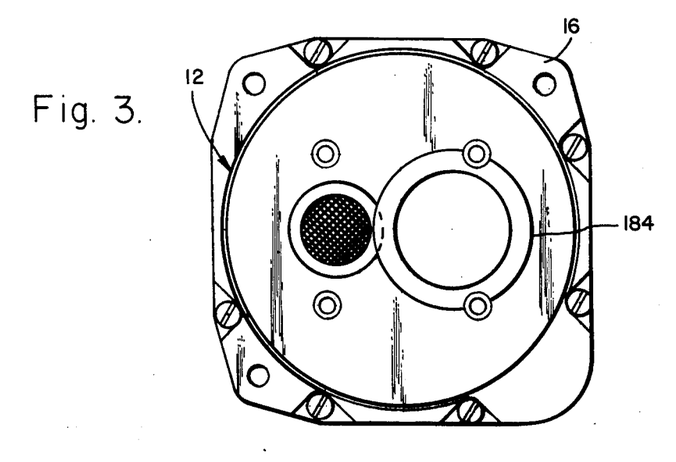
FIG. 3 is a rear view of the altimeter encoder.
Figure 4:
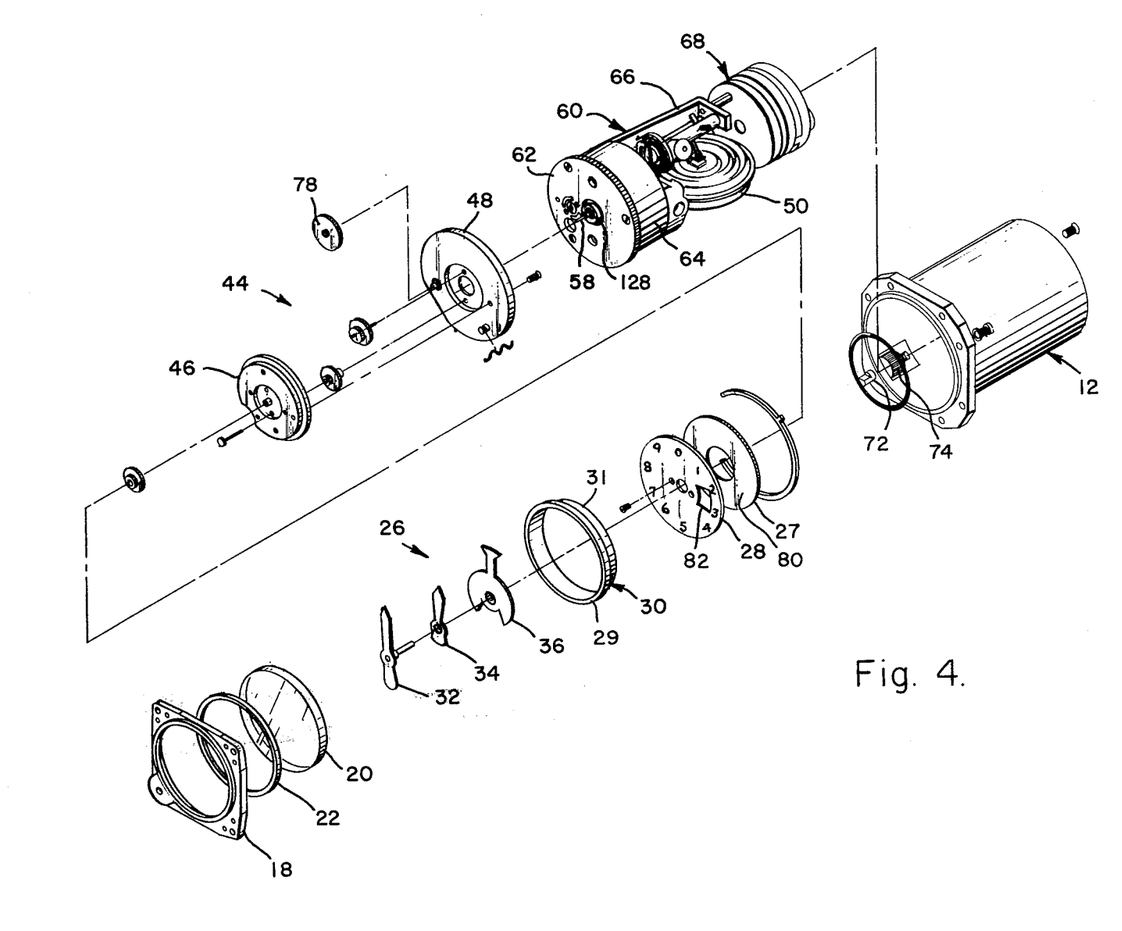
FIG. 4 is a partially exploded perspective view of the internal mechanism of the altimeter encoder.

The support assembly 60 is shown in its fully assembled position in FIG. 4 and in a disassembled, exploded arrangement in FIG. 5. This support assembly 60 includes the barometric gear 62, a spacer 64, a frame 66 and a wire bucket 68.

The barometric gear 62 is a circular plate or disc having teeth on the exterior thereof. These teeth mesh with the gear 74 on the zero adjustment shaft 72.

When the adjustment knob 70 rotates, the shaft 72 and the gear 74 rotate. This in turn causes the barometric gear 62 to rotate.

The barometric gear 62 is rigidly secured to the rest of the support assembly 60. The entire support assembly 60 revolves about its axis when the barometric gear 62 is rotated. During the course of this rotation, the hand staff 58 rotates with the assembly 60. This in turn rotates the gears in the transmission 44 and causes the pointers 32, 34 and 36 to move.

At the same time the foregoing rotation is occurring, the gear 74 is driving the barometric gear 78 which in turn is driving the barometric dial 27. This causes the barometric reading visible in the window 82 to change.

The frame 66 includes a transverse bulkhead 84 disposed generally orthogonal to the axis of the case 12. A portion of the bulkhead 84 is cut-out to provide an enlarged access opening. In addition, a pair of openings or windows may be provided in the bulkhead 84. These windows provide access into certain portions of the assembly and/or reduce the weight of the frame.

A first bracket 86 and a second bracket 88 extend rearwardly from the back of the bulkhead 84. These two brackets or arms extend rearwardly from the opposite edges of the bulkhead 84 and form a pair of mounting supports.

A rim 90 projects forwardly from the front side of the bulkhead 84. Although the rim 90 may be considered as extending circumferentially completely around the periphery of the bulkhead 84, it is partially cut-away and/or discontinuous at various points to provide access openings, etc.

The spacer 64 which has a generally cylindrical shaped side wall 92 is mounted on the rim 90. One end of the spacer 64 is open whereas the opposite end is at least partially closed by an end plate 94. Both the side wall 92 and the end plate 94 are preferably cut-out at various points to provide access openings. The end plate 94 extends across the space formed by the rim 90. The barometric gear 62 is attached to the open end by bolts threaded through the side wall 92 and then into the rim 90.

The bellows 50 includes a pair of diaphragms 96 that are hermetically sealed around their periphery. This forms an air-tight chamber which contains a fixed or constant amount of air therein. The diaphragms 96 are corrugated to make them flexible. As a consequence, when the air pressure on the outside of the bellows 50 varies, the diaphragms 96 will move in and out depending upon whether the air pressure increases or decreases.

A mounting bolt 98 or similar fastening means is fastened to the center of one diaphragm by soldering. This bolt 98 extends through an opening in the arm 88 and a nut is threaded thereon. This is effective to retain the bellows 50 in a fixed position on the frame 66.

A fastening bracket 100 is secured to the center of the second diaphragm 96 to move therewith. Normally the bracket 100 is soldered or otherwise suitably attached to the diaphragm.

A bimetallic link 102 has one end fastened to the end of the bracket 100. The link 102 projects back toward the center of the diaphragm 96. As a result, as the air pressure varies the link 102 will move in and out with the diaphragm 96. Since this link 102 is bimetallic, it will tend to deform as the temperature changes. The deformation can be made to compensate for the changes which occur in the bellows 50 and the other parts of the altimeter-encoder 10 with temperature.

The first or rocker shaft 54 has one end thereof riding on a pivot 104 threaded into the arm or bracket 86. The opposite end of the rocker shaft 54 is carried by a jewel 105 disposed on the end plate 94 of the spacer 64.

A rocker arm 106 is attached to the first shaft 54 at substantially right angles thereto. A link 108 is pivotally attached to the ends of the arm 106 and the bimetallic link 102. As the bellows 50 expands and contracts, the diaphragm 96 moves in and out. This moves the bimetallic link 102 which in turn pushes or pulls the arm 106 and rotates the rocker shaft 54.

A sector gear 110 is mounted on the end of the rocker shaft 54 to rotate with the shaft 54. The sector gear 110 is positioned between the spacer 64 and the bulkhead 84. It has been found desirable to provide a counter weight 112 on the sector gear 110 and a counter weight 114 on the rocker shaft 54. These two counter weights 112 and 114 are adjustable radially so as to permit all of the gravity or other acceleration forces acting on the various parts of the drive train 52 to be completely counter balanced. This, of course, will make the operation of the altimeter-encoder 10 substantially independent of its angular orientation with regard to the vertical, the operational characteristics of the aircraft, etc.

The drive train 52 includes the second or intermediate shaft 56. One end of the shaft 56 is carried by a jewel 116a mounted in the bulkhead 84. The other end of the shaft is mounted in a jewel on the end plate of the spacer 64. This allows the shaft 56 to rotate freely in either direction.

A small pinion gear (not visible in FIG. 5) is mounted on the shaft 56 adjacent the bulkhead 84. This pinion meshes with the sector gear 110 and is driven thereby. Since the diameter of the pinion is much smaller than the diameter of the sector gear 110, the amount of rotation of shaft 56 is greatly increased over the rotation of rocker shaft 54.

An enlarged gear 116 is mounted on the shaft 56 and rotates therewith. A small hair spring is attached to the shaft 56 and exerts a small amount of torque on the shaft 56. The opposite end of the spring is attached to the rim 90. A disc 120 is mounted upon the shaft 56 adjacent the gear 116. This is effective to trap and confine the hair spring in position.

The third shaft or hand staff 58 has one end thereof carried by a journal or jewel 122 fitted into the bulkhead 84. The second end of the staff 58 rides in a bearing 124 in the center of the barometric gear 62 carried on the front of the spacer 64. A small pinion gear 126 is provided on the shaft 58 so as to engage the gear 116 and be driven thereby. Because of the differences in the diameters of the gear 116 and pinion 126, the amount of rotation of the shaft 58 is greatly amplified over the rotation of shaft 56.

In addition, a small gear or pinion 128 is fitted onto staff 58. The shaft 58 extends completely through the pinion 128 and projects into the transmission 44. The pointer 32 for indicating hundreds of feet is mounted upon the end of staff 58.

The transmission 44 includes a first gear train which meshes with the pinion 128. This in turn is connected to the thousand foot pointer 34 and produces a ten-to-one reduction. A second gear train is provided in the transmission 44 to provide a second 10-to-1 reduction. This is connected to the pointer 36 for indicating ten thousand feet.

It may be seen that the portion of the altimeter encoder 10 described so far is a fully operative and usable altimeter. As an aircraft carrying the altimeter-encoder 10 is ascending or descending, the bellows 50 expands or contracts. This in turn causes the arm 106 to rotate the first or rocker shaft 54 and turn the sector gear 110. The sector gear 110 in turn drives the pinion gear on the second shaft 56.

The large gear 116 on the second shaft 56 in turn drives the pinion gear 126 on the third shaft or hand staff. The hand staff 58 and the shafts driven by the transmission 44 from pinion 128 cause the pointers 32, 34 and 36 to move whereby the altitude is correctly indicated.

In addition to the foregoing, it is desirable to include an encoder for generating a sequence of data signals representing altitude. In the present instance, the encoder is adapted to fit essentially inside of the spacer 64 and onto the rear end of the frame 66.

Figure 7:
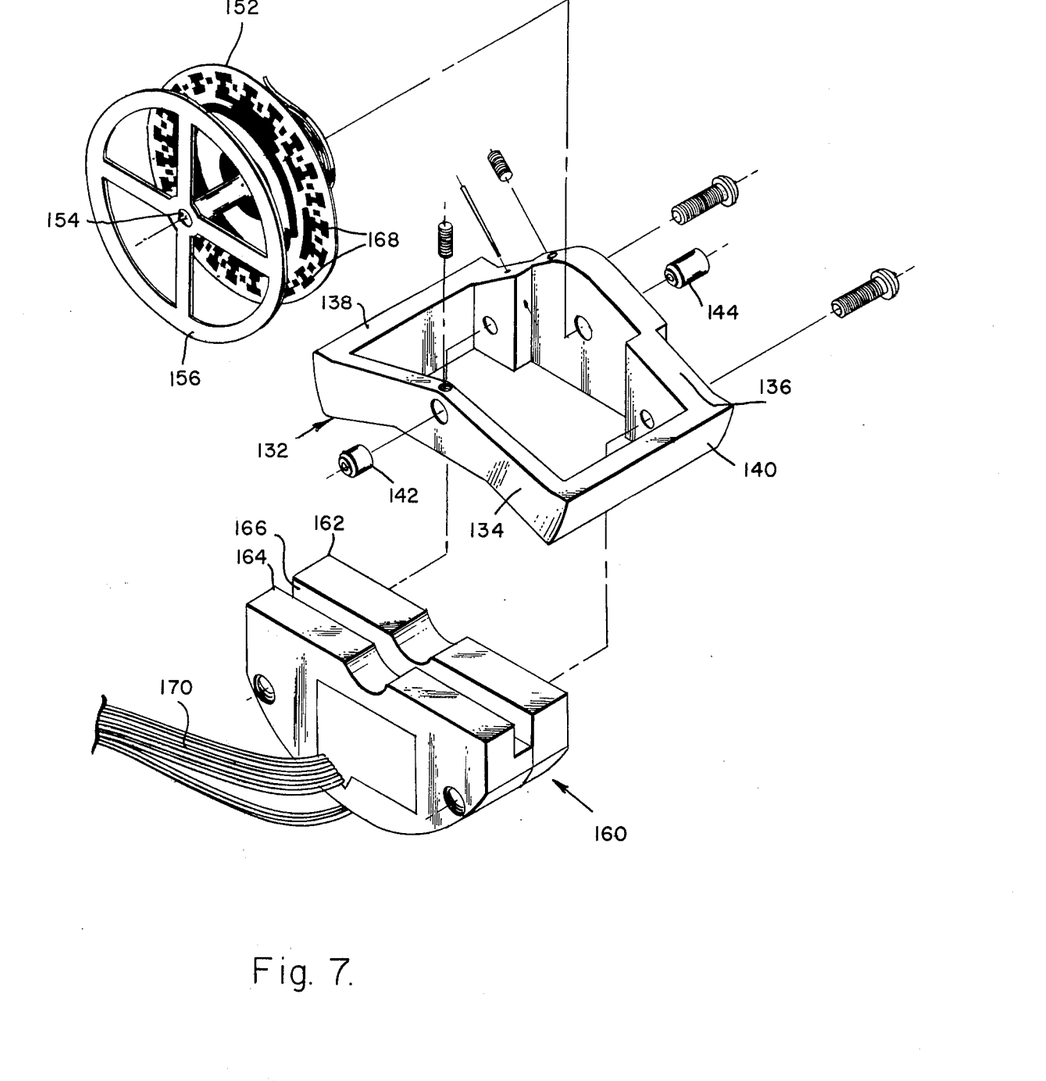
FIG. 7 is an exploded perspective view of the encoder assembly used in the altimeter encoder.

As best seen in FIG. 7 the encoder includes a frame 132 that carries the operative parts. The frame 132 is a generally rectangularly shaped member having a pair of sides 134–136 and a pair of ends 138–140. The sides 134–136 of the frame 132 include a pair of openings for receiving a pair of jewel housings 142–144.

Jewel housing 144 is connected to an eccentric 146 mounted in the plate or barometric gear 62. A pair of spring biased bolts 150 are provided in the circular slots 148. These are effective to retain the frame 132 mounted on the barometric gear 62 by means of a friction fit. The friction is adequate to retain the frame 132 in a fixed position during normal use including vibration, etc. However, the friction is sufficiently small to allow the frame 132 to rotate around the eccentric 146 if an adequate torque is applied thereto.

The encoder includes an encoder disc 152 of the photo-optical variety. The disc 152 is carried upon the rotatable shaft 154. The opposite ends of the shaft 154 are mounted upon jewels in the bushings or housings 142–144. This will allow the shaft 154 and the disc 152 thereon to rotate freely within the frame 132.

A large drive gear 156 is provided on the shaft 154 adjacent the data disc 152. This gear 156 is designed to mesh with a pinion or take-off gear 158 mounted on the second shaft 56 in the drive train 52.

As the bellows 50 expands and contracts, it operates the drive train 52 and causes the second shaft 56 to rotate. As the shaft rotates, the pinion or take-off gear 158 thereon drives the encoder gear 156 which in turn rotates the shaft 154 and encoder disc 152.

It may be seen this drive motion or take-off (i.e., the addition of the encoder assembly) is accomplished without adding any shafts or gears to the drive train 52 between the 100 feet pointer 32 and the bellows 50. There are still only three shafts 54, 56 and 58 in the drive train 52. This is effective to eliminate adding any significant friction, hysterisis, etc., to the altimeter mechanism. It also simplifies and reduces the cost of adding the encoder to the altimeter.

Moreover, since the pointer 32 and the encoder disc 152 are both driven directly off the second shaft 56, the two will "track" very closely; i.e., they will always be indicating the same altitude within a very narrow margin of error.

A pickup or sensor unit 160 is mounted on the frame 132 so as to scan the encoder disc 152 as it rotates. The sensor 160 is formed by a pair of blocks 162–164 fastened together to form a narrow slot 166 therebetween.

This slot 166 is adapted to have the disc 152 pass therethrough. One of the blocks 162 includes an array of emitters and the other block 164 includes an array of receivers. These are preferably very small and compact. Accordingly, light emitting diodes are used. Although the radiations may be in the visible range, it has been found advantageous to use diodes which operate in the near infrared range.

The encoder wheel or disc 152 includes a series of data tracks 168 arranged in several concentric circles. By way of example, in the present instance there are nine separate tracks 168, although any number of tracks may be used. Each track 168 includes a series of opaque and transparent portion which are coded to represent altitude.

As the disc 152 rotates, the various diodes scan the opaque and transparent portions in the respective tracks. The diodes in turn produce signals corresponding to whether the particular track 168 is transparent or opaque. As a result, the diodes will be effective to produce a nine bit parallel digital signal coded corresponding to the altitude.

In order to improve the resolution and accuracy of the encoder, it is desirable to provide a mask 151 between the diodes and the encoder disc 152. The mask 151 includes a separate transparent slit or aperature for each data track. Each slit has a width which is just equal to the width of a data bit on the track. As a result, each aperature and the associated diode can only "read" one data bit on one track.

The mask is normally a thin piece of glass (for example about 0.005 inches thick) and as a consequence, is very delicate. This makes it necessary to utilize a special mounting for the mask 151. The mounting should not impose any stress on the mask 151 that would cause it to crack. It is also essential the mask be securely fastened such that it cannot move or escape from its mounting. If the mask moves, it will cause inaccurate readings. However, if the mask 151 comes completely loose, the encoder will fail to operate. If the mask 151 moves sufficiently it may jam into some of the moving parts whereby the entire altimeter will fail to operate.

In the present instance a resilient retainer clip 165 is provided to secure the mask 151 in position. This clip 165 extends across the width of the block 162. The end of the clip 165 is bolted in place by the bolts which join the blocks 162 and 164 together. The retainer clip 165 includes a small offset segment that fits over and bears lightly against the mask. This is effective to retain the mask 151 in its position.

In addition, the mask 151 may be bonded or cemented to the block 162 and to the clip 165 to provide two separate bonds. Preferably the two bonds are accomplished with bonding material from two different batches or mixes or else two separate and different bonding materials may be used. In this way if one of the bonding agents should fail, it is reasonable to assume the other will remain intact. As a result, the chances of the mask moving or becoming dislodged is virtually nonexistent.

As previously explained, the frame 132 is secured upon the end plate 94 in the spacer 64 by a friction mounting. Thus, although during operating conditions the frame 132 remains fixed in position, it is possible to move the frame 132 relative to the barometric gear 62 by applying sufficient force thereto. As the frame 132 is moved it rotates around the jewel housings 142 and 144 (i.e., the axis of the shaft) and carries the sensor 160 around the edge of the encoder disc 152. Accordingly, the position of the sensor 160 can be changed relative to the disc 152 without in any way changing the relationship of the disc 152 to the drive train 52. Therefore, by moving the frame 132 the sensor 160 can be positioned so that it is reading the portion of the disc 152 corresponding to the altitude indicated by pointers 32, 34 and 36.

The pickups in the sensor 160 are individually connected to several wires in a multi-conductor, flexible cable 170. The cable 170 runs along the side of the frame to a first wire bucket 68 on the rear thereof. The wire bucket 68 is mounted on the frame 66 by a pair of columns 174. As a result, the wire bucket 68 rotates with the frame 66.

A second wire bucket 176 is mounted through a stationary structure to the rear of the case 12. As a result, this wire bucket 176 remains in a fixed position relative to the case 12 even though the frame 66 and the wire bucket 68 rotate.

The second wire bucket 176 mates with the first wire bucket 68 to form an open space therebetween. Several concentric loops of a spiral of the cable 170 are disposed in the space formed between the wire buckets 68 and 176. This avoids the use of any sliding contacts while allowing the frame 66 to rotate two or three complete turns without the cable 170 binding, etc.

Figure 6:
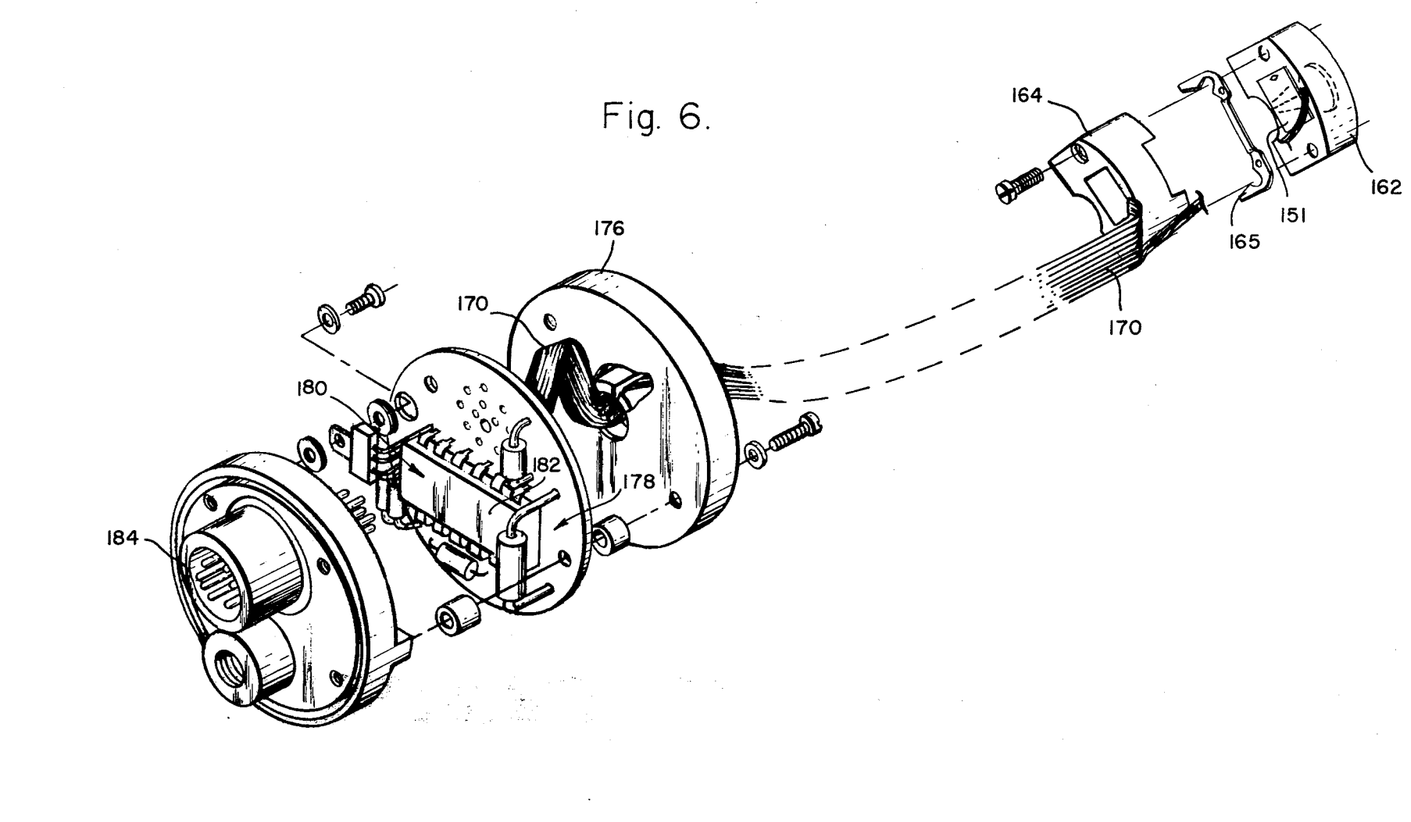
FIG. 6 is an exploded perspective view of an electronic portion of the altimeter encoder.

As may be partially seen in FIG. 6, the end of the cable 170, after passing through a slot in the periphery of wire bucket 68 and thereafter being formed into the several concentric loops, extends through the center of the wire bucket 176 and is connected to the stationary structure which carries the wire bucket 176.

The stationary structure includes a printed circuit board 178. A solid state circuit 180 is mounted on the circuit board. In the present instance, this circuit includes an integrated circuit chip 182 which is mounted on the rear of the circuit board 178. The circuits provided by this chip 182 are effective to amplify the signals to a more useful level and improve the signal-to-noise ratio. They are also effective to match the impedance and formulate the signals into a format compatible with the type of transponder being used.

A terminal socket 184 is mounted on the rear of the stationary structure, and when fully assembled extends through the case 12 for receiving a suitable connector on the end of the cable leading to the transponder.

In order to use the altimeter encoder, it is first assembled, tested and calibrated. First of all the support assembly 60 is put together by mounting the various operative parts on the frame 66 substantially as shown in FIG. 4. At this point the bellows is operatively interconnected with the indication means 26 by the drive train 52. More particularly the bellows 50 is connected to the rocker shaft 54 by the rocker arm 106. The rocker shaft 54 in turn drives the second or intermediate shaft 56 by means of sector gear 110. The third shaft or hand staff 58 in turn is driven by the gear 116 meshing with the pinion staff 126. The transmission and indicator means may also be added onto the front of the support assembly. At this point the subassembly is capable of operating as an altimeter. Accordingly, this much of the subassembly may be tested and calibrated by adjusting the length of the rocker arm 106, the positions of the counter balance weights, etc.

The encoder is next slipped into the interior of the spacer 64. The encoder frame 132 with the various operative parts of the encoder mounted thereon can be easily slipped into and out of the spacer 64. When the frame 132 is in position inside the spacer 64 the eccentric 146 carries jewel housing 144 whereby the encoder is carried by the eccentric 146.

The eccentric is next rotated to move the encoder gear 156 out of engagement with the drive gear or pinion 158. This allows the drive gear 156 and encoder disc 152 to rotate freely inside of the frame. As the disc 152 rotates, it will travel through the slot 166 whereby the data tracks 168 are scanned by the diodes.

The gear 156 and disc 152 are then rotated until the diodes register with the transparent and opaque codings which produce a digital altitude signal approximately equal to the altitude visually indicated by the pointers 32, 34 and 36. Because of the spacing of the teeth on the gears, the two readings may not be absolutely identical. However, as soon as the two readings are essentially identical, the eccentric 146 is rotated until the encoder gear 156 fully meshes with the drive gear 158. Once this mesh is properly established it is not possible for the encoder gear 156 or disc 152 to rotate relative to the various drive shafts, 54, 56 and 58, etc.

The next step is to rotate the frame 132 about the axis of the jewel housings 142 and 144 until the diodes are producing a reading identical to the visually indicated altitude. The shoulder bolts are now tightened to secure the frame onto the back of the barometric gear 62. It should be noted that this is accomplished by a snug or firm friction engagement. As a result, the frame 132 will normally rotate with the barometric gear and not move relative thereto. However, it is possible by the application of a modest force against the frame 132 to rotate the frame 132 relative to the barometric gear 62.

Once the foregoing assembly is completed and the necessary calibration procedures are undertaken, the entire assembly is slipped into the case 12 and securely locked into position. It should be noted that the entire assembly is fully calibrated and adjusted, etc., prior to its installation inside the case. As a result, once the assembly is installed in the case no further adjustments, etc., are required. The altimeter encoder 10 may be simply inserted into the air craft and interconnected with the transponder.

Figure 8A:
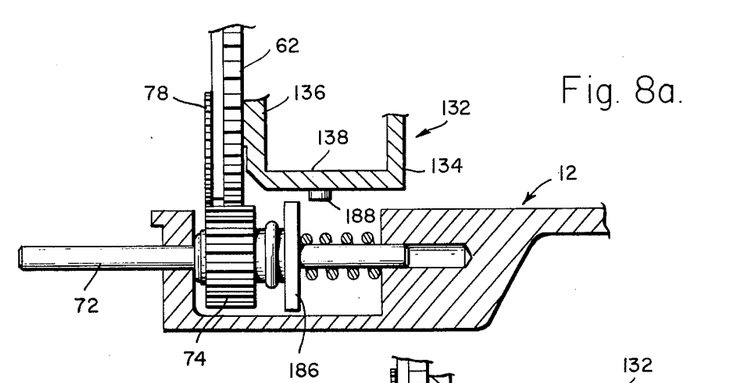
FIGS. 8a, 8b and 8c are a series of cross-sectional views of the barometric adjusting and compensating mechanism in three different operating conditions.

When the altimeter encoder 10 is installed in the air craft the bellows 50 will expand and contract as a result of variations in barometric pressure and also as a result of changes in altitude. In order to compensate for the variations in barometric pressure, the barometric adjustment knob 70 is manipulated until the correct barometric pressure is indicated in the window 82. This is accomplished while the shaft 72 is positioned substantially as shown in FIG. 8a. The shaft 72 is in its fully extended position with the pinion 74 engaging the teeth on the barometric gear 78 and the barometric gear 62.

Rotating the knob 70 will simultaneously rotate both the gear 78 and gear 62 and thereby rotate the entire support assembly 60. Following this adjustment the barometric altitude will be correctly indicated on the face of the altimeter. Also, the encoder will be accurately producing a digital signal for the same altitude.

Under some circumstances, the altimeter encoder 10 may need some adjustments. For example, during normal operating conditions the characteristics of the bellows 50, the various springs, etc., may change somewhat with age. As a consequence, it may be that even though the correct barometric pressure is indicated in the window 82, the altimeter is not visually or electroncially accurately indicating altitude. If this error exceeds acceptable limits, the altimeter encoder 10 should be adjusted to bring the indication back within tolerance. Normally this can be accomplished without removing the altimeter encoder 10 from the air craft.

The barometric pressure compensation is accomplished by manipulating the zero adjust knob 70 as described above. However, to make further adjustments the barometric knob 70 is removed from the shaft 72. This frees the shaft 72 and allows it to be pushed inwardly.

Figures 8B, 8C:
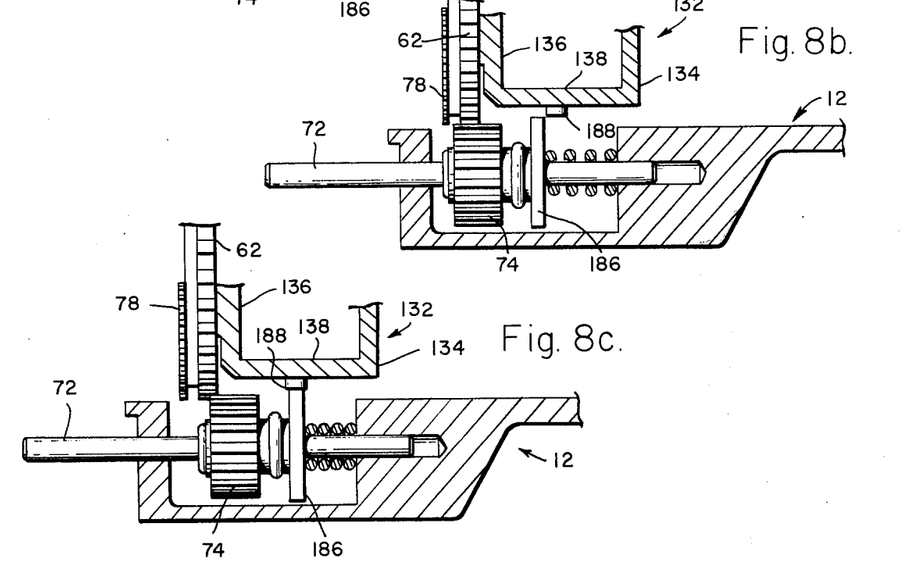

The shaft 72 may be pushed inwardly a first increment to place it in an intermediate position such as shown in FIG. 8b. In this condition the shaft 72 is depressed just enough to cause the pinion 74 to disengage from the barometric dial 78. The shaft 72 may now be rotated to drive the barometric gear 62 without moving the position of the barometric dial 78. This adjustment is made (with the correct barometric pressure indicated in window 82) until the altitude is correctly indicated on the face of the altimeter.

Normally the encoder will always continue to produce digital signals corresponding to the altitude being visually indicated by the altimeter. However, if for some reason the encoder does not generate signals identical to the visual indication, the shaft 72 may be pushed inwardly as far as it will go. In this third position the shaft 72 is substantially as shown in FIG. 8c.

At this time the pinion 74 still engages the barometric gear 62. However, in addition the arm 186 is now in a position to engage the projection 188 extending from the end 138 of the encoder frame 132. The shaft 72 is now rotated through a sufficient distance to cause the arm 186 to engage the projection 188. When the arm 186 engages the projection 188 rotation of the frame 132 is prevented. In other words, the frame 132 is locked in a fixed position. The shaft 72 is then rotated. This rotates the barometric gear 62 and turns the support assembly 60. This in turn causes the gear 156 and encoder disc 152 to rotate inside of the now stationary frame 132. This adjustment is continued until the altitude visually indicated on the face of the altimeter is identical with the signals produced by the encoder. Following completion of this adjustment, the shaft is released so it returns to its normal position (i.e., FIG. 8a). The barometric knob 70 is then securely locked onto the shaft. It will be noted that as long as the knob 70 is on the shaft 72 the only adjustment which can be made by the pilot is the normal barometric setting.

It can be seen that the present invention allows the digital encoder assembly to be added to the altimeter mechanism without adding any material parts thereto. The altimeter mechanism still includes the same identical three shafts 54, 56 and 58 between the bellows 50 and the pointer 32.

In order to add the digital encoder assembly, the only modification to the drive train 52 is the addition of a pinion gear 158 on the second shaft 56. This does not in any way "cut into" the drive train 52 and/or in any way add anything directly into the drive train 52. The encoder includes only a single shaft 154 and a single gear 156. This ensures a similarity between the visual indication and the electronics indication.

In addition, the entire altimeter encoder can be assembled, calibrated and tested before it goes into the case 12. Placing it inside the case does not in any way affect its operation, calibration, etc.

Moreover, the digital encoder assembly can be removed and/or added to the subassembly without in any way affecting the operation of the altimeter mechanism and/or its calibration. The only contact between the altimeter drive train and the encoder is the meshing of the encoder gear 156 with the pinion 158.

The barometric setting of the altimeter can be accomplished in the usual manner by the pilot merely manipulating the barometric adjust knob. However, it is also possible to re-calibrate the altimeter mechanism and to synchronize the operation of the encoder without in any way removing the altimeter encoder from the air craft instrument panel.

I claim:
1. A digital encoder adapted to be mounted in an altimeter having an aneroid bellows responsive to altitude, an indicator for visually indicating altitude and a gear train operatively interconnecting said bellows and indicator, said digital encoder including the combination of:
   an encoder housing adapted to be mounted on said altimeter,
   a drive gear rotatably mounted in said housing, said gear being positioned to mesh with the gear train in said altimeter and to be driven thereby when said housing is mounted in said altimeter,
   a photo-optical data disc rotatably mounted on said housing, said photo-optical disc being operatively interconnected with said drive gear and driven thereby,
   a series of opaque and transparent data regions on said data disc, said regions being digitally coded to correspond to altitude,
   a photo-optical sensor mounted on said housing and positioned adjacent said disc for scanning said regions as said disc is driven by said gear, said sensor being effective to produce digital signals representing altitude, and
   means for movably mounting said encoder housing in said altimeter whereby the housing may be moved relative to the gear train without disengaging said gear therefrom to thereby change the position of said photo-optical sensor relative to the data disc.

2. The digital encoder of claim 1 including adjusting means for adjusting the position of said sensor relative to said data disc while said gear is meshed with said gear train.

3. The digital encoder of claim 1 including adjusting means on said housing, said adjusting means being effective to adjust the position of said housing relative to said gear train.

4. A digital encoder adapted to be mounted in an altimeter having frame structure with a pneumatic aneroid bellows mounted thereon responsive to altitude, an indicator mounted on said frame structure for visually indicating altitude and a gear train mounted on said frame structure operatively interconnecting said bellows and indicator, said encoder including the combination of a first portion and a second portion, said portions being adapted to be mounted on the frame structure in said altimeter, a drive gear on said first portion, said drive gear being adapted to mesh with the gear train and be driven thereby when said first portion is mounted upon said frame structure, an encoder disc on said first portion, said encoder disc being operatively interconnected with said drive gear and rotatably driven thereby, data codings on said disc, said codings being calibrated to correspond to altitude, a sensor on said first portion positioned adjacent said disc for scanning the data codings thereon, said sensor being effective to produce electrical signals corresponding to the codings on said disc, and data processing means on said second portion operatively interconnecting said sensor, said data processing means being effective to produce digital altitude signals.

5. The digital encoder of claim 4 wherein
said first portion is a housing adapted to be moved within said frame structure, and
said data processing means includes a solid state semiconductor chip.

6. An encoder adapted to be mounted in an altimeter having an altitude responsive device, an altitude indicator and a drive train operatively interconnecting said device with said indicator, said encoder including the combination of a frame, a pair of jewel housings on said frame forming a pair of aligned bushings for being rotatably mounted on said altimeter, said housing being axially aligned and including axially aligned jewels, a shaft rotatably mounted on said jewels, a drive gear mounted on said shaft, said drive gear being adapted to mesh with said drive train and driven thereby, an encoder disc mounted on said shaft to rotate therewith, said encoder disc being calibrated to correspond to altitude, and a sensor mounted on said frame and positioned to scan the calibrations on said disc, and produce signals representing altitude.

7. The encoder of claim 6 including
adjusting means for rotating the frame around the jewel housings whereby the relationship between said sensor and said encoder is changed.

8. A digital encoder adapted to be mounted in an altimeter having a support assembly with a pneumatic aneroid bellows mounted thereon responsive to altitude, an indicator mounted on said support assembly for visually indicating altitude and a drive mounted on said support assembly operatively interconnecting said bellows and indicators, said encoder including the combination of a first portion adapted to be mounted on said support assembly at a first location, a second portion adapted to be mounted on the altimeter at a second location, a frame in said first portion adapted to be rotatably mounted on said support assembly at said first location, a take-off gear rotatably mounted on said frame and adapted to mesh with the drive train and be driven thereby when said frame in said first portion is mounted upon said support assembly, an encoder disc coupled to said take-off gear and rotatably driven thereby, data codings on said disc calibrated to correspond to altitude, means scanning the data codings and producing electrical signals corresponding to the codings on said disc, and data processing means on said second portion operatively interconnecting said means and effective to produce digital altitude signals.

9. An altimeter adapted to receive an altitude encoder having a housing, a photo-optical data disc in said housing, a drive gear in said housing for driving said data disc, a photo-optical sensor for scanning said disc and data processing means coupled to said sensor for producing digitally coded altitude signals, said altimeter including the combination of an outer case, a frame assembly rotatably disposed inside of said case, an aneroid bellows responsive to altitude mounted on said frame assembly, a spacer mounted on one end of said frame assembly, said spacer being adapted to receive said housing, a plate assembly mounted on said spacer, said plate assembly forming a barometric gear, an altitude dial calibrated to represent altitude, a visual indicator positioned adjacent said dial, said indicator being arranged to register with the calibrations thereon to thereby indicate altitude, a drive train mounted on said frame assembly, said drive train being operatively interconnected with said aneroid bellows and with said visual indicator, means in said drive train positioned in said spacer adjacent said visual indicator and adapted to drive the data disc.

10. The altimeter of claim 9 including
means engaging said barometric gear for rotating the frame assembly within said case to thereby compensate for variations in barometric pressure.

11. The altimeter of claim 9 including
means for varying the position of said encoder housing within said spacer to adjust the position of the encoder relative to the visual indicator.

12. The altimeter of claim 9 including
means engaging said barometric gear for rotating the frame assembly within said case to thereby compensate for variations in barometric pressure, and
means for varying the position of said encoder housing within said spacer to adjust the position of the encoder relative to the visual indicator.

13. An altimeter encoder including the combination of a frame assembly, an aneroid bellows responsive to altitude mounted on said frame assembly, a spacer member mounted on said frame assembly, a barometric gear mounted on said spacer member, an altitude scale, a visual indicator arranged to register with said scale and indicate altitude, a gear train mounted on said frame assembly said gear train being operatively interconnected with said aneroid bellows and with said visual indicator, a drive gear in said gear train adjacent said indicator, an encoder housing mounted on said frame assembly, a photo-optical data disc rotatably mounted on a shaft in said housing, a gear on said shaft for driving said data disc,
said last mentioned gear being operably connected to said gear train,
and a sensor in said housing for scanning said disc and producing digitally coded altitude signals.

14. An altimeter encoder including the combination
an outer case,
an altimeter mechanism in said case,
an encoder mechanism in said case,
a support structure in said altimeter mechanism rotatably disposed inside of said case,
an aneroid bellows responsive to altitude mounted on said support structure,
an altitude dial calibrated to represent altitude,
a visual indicator positioned adjacent said dial, said indicator being arranged to register with the calibrations thereon to thereby indicate altitude,
a drive train mounted on said support structure, said drive train being operatively interconnected with said aneroid bellows and with said visual indicator,
a frame in said encoder mechanism, said frame being rotatably mounted upon said support structure,
a shaft on said frame,
an encoder drive gear on said shaft engaging said drive train, a photo-optical data disc on said shaft to rotate therewith,
a photo-optical sensor on said frame for scanning said disc, and
data processing means coupled to said sensor for producing digitally coded altitude signals.

15. The altimeter encoder of claim 14 including
barometric adjusting means for simultaneously rotating said support structure and the frame thereon.

16. The altimeter encoder of claim 14 including
alignment adjusting means for rotating the frame on said support structure to change the position of said sensor relative to said disc.

17. The altimeter encoder of claim 14 wherein the drive train includes
three shafts between the aneroid bellows and the indicator, and
the drive gear is driven from the middle of said shafts.

18. An altimeter encoder including the combination of
a support structure,
an aneroid bellows responsive to altitude mounted on said first section,
visual indicator means mounted on said support, said indicator being calibrated and arranged to visually indicate altitude,
a gear train operatively interconnected with said aneroid bellows and said visual indicator whereby said indicator is responsive to altitude,
a drive gear in said gear train disposed adjacent said indicator,
an encoder means including
a photo-optical data disc,
an encoder gear for driving said data disc,
a sensor for scanning said disc and producing digitally coded altitude signals, and
mounting means in said section for retaining said encoder means therein, said encoder gear meshing with said drive gear.

19. In an altimeter encoder means, the combination of:
a frame assembly;
an altimeter means mounted on said frame assembly and including
an aneroid bellows responsive to altitude,
an indicator means spaced from said aneroid bellows,
and gear train means interconnecting said aneroid bellows and said indicator means,
said gear train means including a shaft having an encoder pinion gear thereon,
and a hollow spacer member between said aneroid bellows and said indicator means;
and an encoder means rotatably mounted about an encoder axis within said hollow spacer member and including
an encoder frame,
an encoder driven gear on said encoder axis normally in meshed engagement with said encoder pinion gear,
said shaft carrying said encoder pinion gear carrying a drive gear engaged with a pinion gear for driving said indicator means.

20. An altimeter encoder means as stated in claim 19 including
adjustment means for said encoder frame for moving said encoder axis to move said encoder driven gear out of meshed engagement with said encoder pinion gear for adjusting said encoder means with respect to said altimeter means.

21. An altimeter encoder means as stated in claim 20 including
a case for said frame assembly, altimeter means, and encoder means;
and means for rotating said frame assembly within said case to adjust the altimeter for ambient barometric pressure.

22. An altimeter encoder means as stated in claim 20 including
means for independently adjusting said altimeter means and said encoder means.

* * * * *